US005653420A

United States Patent [19]

Sell

[11] Patent Number: 5,653,420

[45] Date of Patent: Aug. 5, 1997

[54] LOCKING CONTROL VALVE HANDLE

[75] Inventor: Leslie J. Sell, Botbell, Wash.

[73] Assignee: Ingersoll-Rand Company, Woodcliff Lake, N.J.

[21] Appl. No.: 586,628

[22] Filed: Nov. 13, 1995

[51] Int. Cl.$^{6}$ .............................. F16K 35/04; F16K 11/14

[52] U.S. Cl. .................... 251/95; 74/171 XY; 137/636.1; 137/636.2; 251/96; 251/100; 251/229

[58] Field of Search .............................. 137/636.1, 636.2; 251/95, 96, 100, 229, 251; 74/471 R, 471 XY

[56] References Cited

U.S. PATENT DOCUMENTS 3,806,962 4/1974 Sievers ................................ 137/636.1
4,566,492 1/1986 Bessard ................................ 137/636.1
4,957,137 9/1990 Wang ................................ 137/636.1
5,251,660 10/1993 Hori et al. ............................ 137/636.1
5,433,249 7/1995 Tsubota et al. ........................ 137/636.1

*Primary Examiner*—George L. Wilton
*Attorney, Agent, or Firm*—Walter C. Vliet

[57] ABSTRACT

A valve handle is provided with a hand rotated valve skirt containing a notch which in one position permits valve operation when the notch is aligned with the valve and in a second spring biased position the skirt interferes with the valve body to prevent accidental operation, the skirt further providing a dust cover for the valve operating mechanism.

9 Claims, 3 Drawing Sheets

LOCKING CONTROL VALVE HANDLE

BACKGROUND OF THE INVENTION

This invention relates generally to pneumatic control valves for winches, hoists, and the like and more particularly to a safety device for preventing inadvertent operation of the valve. In the past, valve actuators have been provided with access inhibiting devices which prevented accidental operation of the valve or finger operated released devices which required additional manual dexterity to operate and are often subject to damage or intentional defeat.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a locking control valve handle comprising a tubular hand grip portion adapted for rotational mounting on a valve actuator rocking about an axis; a skirt extending from the handle to encircle the actuator and a portion of a valve body to which the valve actuator is mounted; and the skirt being further provided with a notch which in one hand rotated position permits clearance between the guard and the valve body to permit rocking of the valve actuator to operate the valve, and in a second handle rotated position the guard interferes with the valve body to prevent rocking of the actuator as a valve operation safety.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

The present invention describes a control valve handle that provides a lockout against accidental operation and is also a dust cover for the components of the valve. The valve provides pilot pressure signals to operate a main valve. The handle on the pilot valve is pivoted fore and aft by the operator to supply the desired signal to the main valve. Only light effort is required to pivot the handle and it is desirable to provide a safety device to prevent accidental operation.

Figure 1:
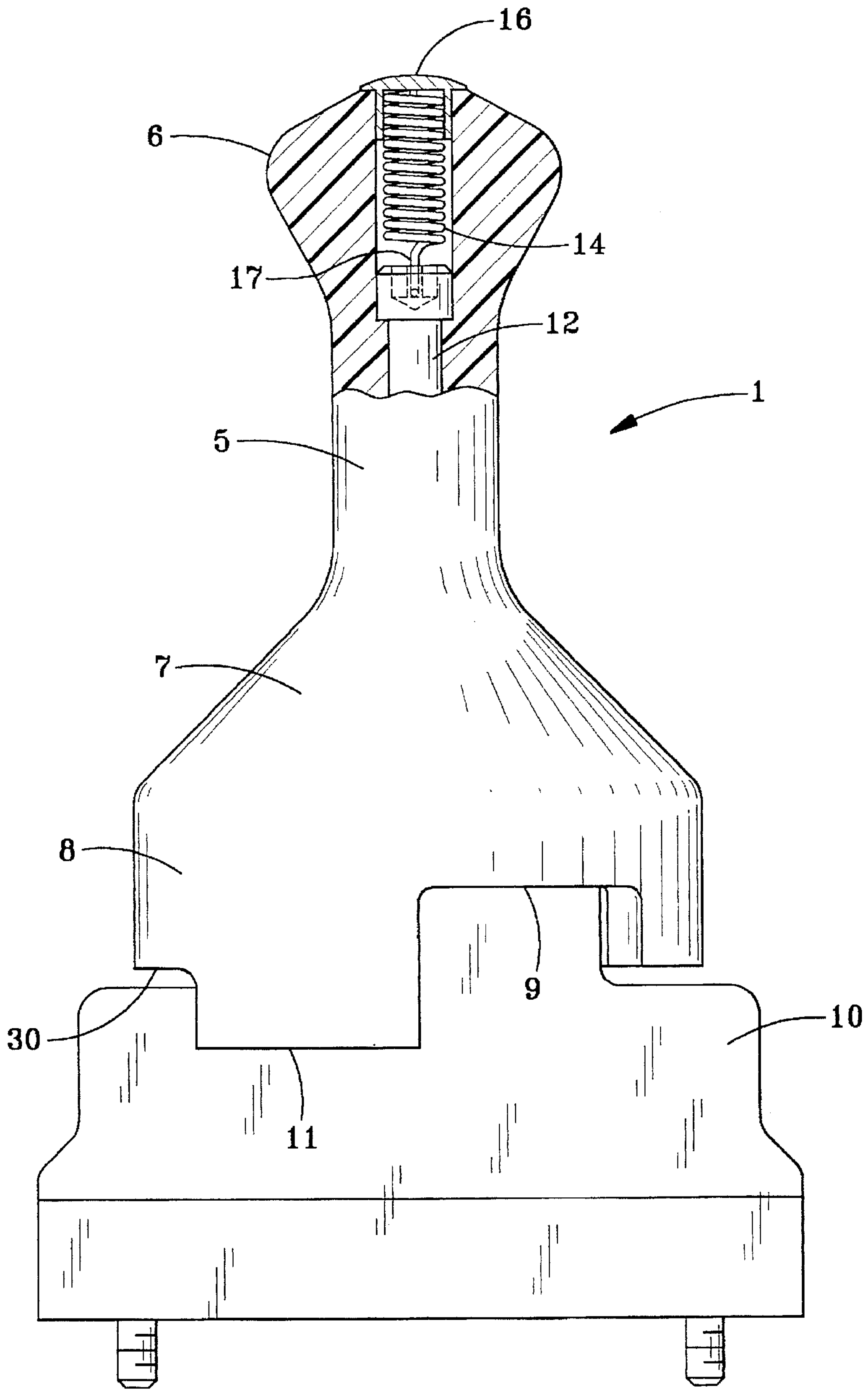
FIG. 1 is a side elevation of a locking control valve handle and valve body to which it is attached according to the present invention.

As shown in FIG. 1, a control valve handle according to the present invention is shown and generally designated by the reference numeral 1. The handle has a shaped hand grip section 5 of a generally tubular shape having a bullous head 6 to provide a secure hand grip. The handle 1 is further provided with a lower skirt portion 7 of a generally conical portion followed by a cylindrical portion 8. The cylindrical portion of the skirt 8 is further provided with notches or slots 9 and 9' (shown in FIG. 3) which are positioned 180 degrees apart on the cylindrical portion of the skirt. The cylindrical portion 8 is also further provided with a stop tab 11 which extends below the skirt so as to interfere with the valve body 10 as a rotation stop when the handle 5 is hand rotated to the operating position or bias rotated by a spring to the safety position as will be later described.

Figure 2:
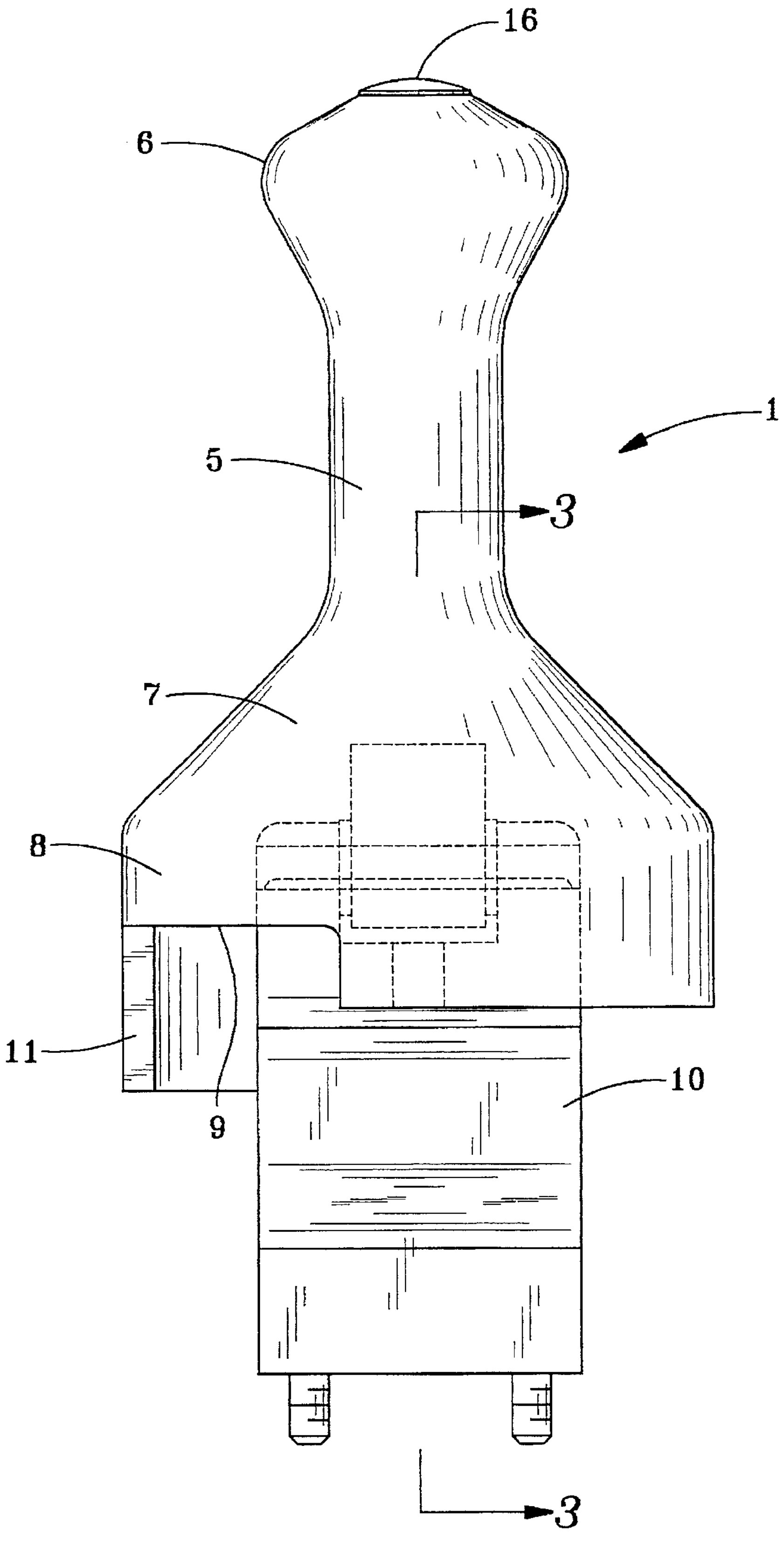
FIG. 2 is a front elevation of the locking control valve showing the valve portion and mounting partially sectioned.
Figure 3:
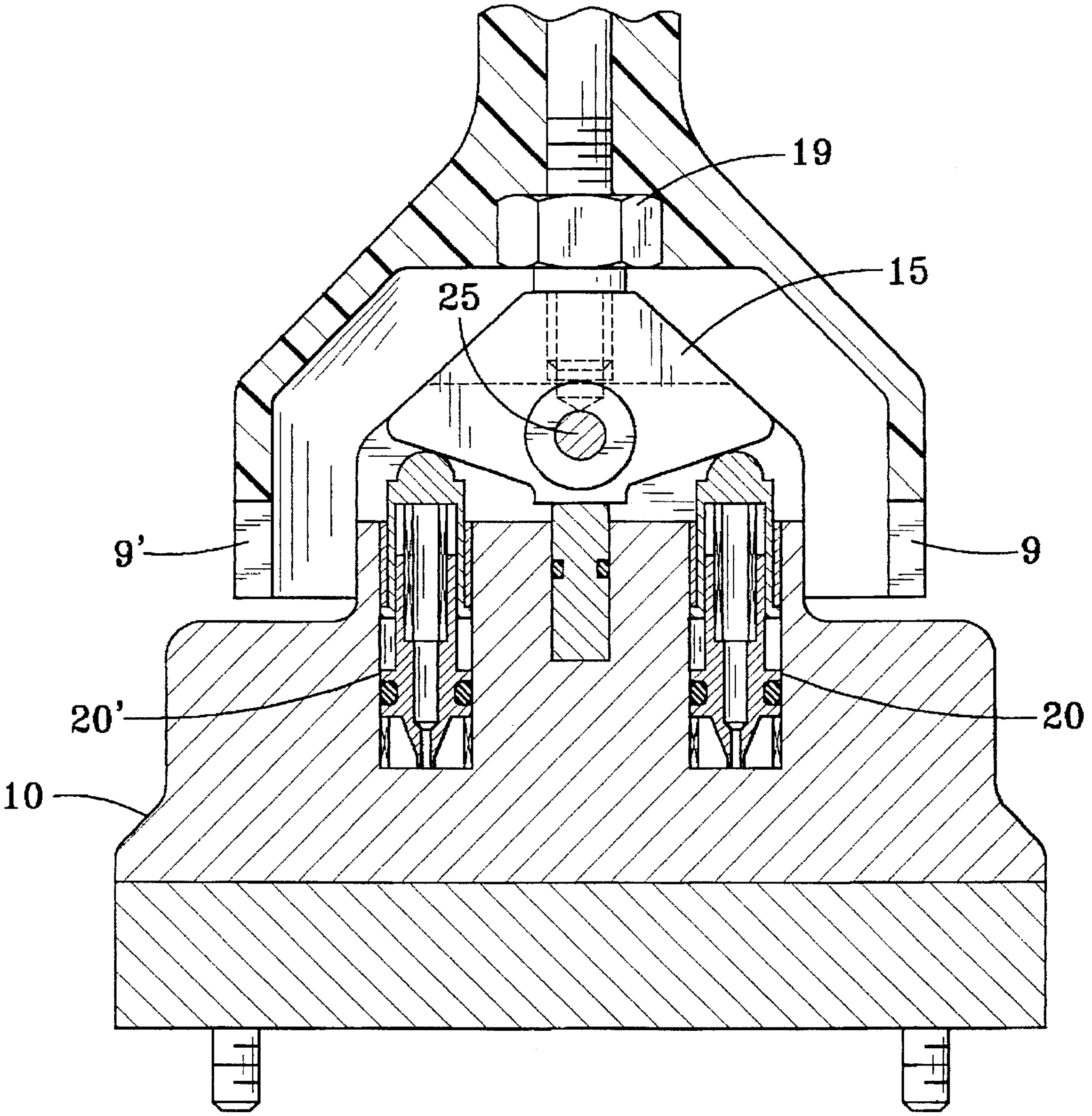
FIG. 3 is an elevational cross section of the valve and handle shown in cross section taken at Section 3—3 of FIG. 2 with the handle rotated to the hand rotated position.

As seen in FIGS. 2 and 3, the handle is mounted for rotation on a valve actuating stem 12 for hand powered or spring loaded rotation about the stem. The stem in turn operates a rocking cam 15 which in turn operates the spring loaded return function producing poppet valves 20 and 20'. These valves may control any function such as, for example, the rising or lowering of a hoist in a pneumatic valve operation well known in the industry. The internal porting for this is not shown.

According to the present invention the stem and the rocking cam 15 are mounted for rotation about a pin 25 which permits the stem and cam to rock back and forth in one plane about the pin 25 as a means of actuating the poppet valves 20 and 20'. This also limits the movement of the handle to a back and forth rotation about the pin 25, however, as previously described, the handle may be rotated about the stem either by hand in one direction or by spring bias return in the opposite direction.

Referring to FIG. 1, when the handle is in the bias rotated position as shown in FIG. 1, the stop tab 11 limits the rotation in a clockwise direction to an orientation of the handle wherein the lower edge of the skirt 30 is spaced apart from the valve body 10 by a small amount. The amount is insufficient to allow enough rocking action to operate the poppet valves 20, 20'. Thus, when the handle is in the safety position, as indicated in FIG. 1, the valve is inoperative. If the handle is hand rotated counterclockwise until the stop tab 11 intercepts the valve body 10 to the right as shown in FIG. 1, the notches or slotted section 9 and 9' of the skirt (as seen in FIG. 3) become aligned with the valve body thereby permitting greater clearance between the skirt section and the valve body. In the hand rotated position sufficient clearance is provided to permit the handle to be rocked the amount necessary to operate the valve poppets in either direction.

To permit handle about the stem or the handle 5 has a central bore that cooperates with stem 12 so that the handle is free to rotate about the stem and is retained by lock nut 19. The stem 12 is threaded and locked into the valve actuator or rocker cam 15. A torsion spring 14 is friction fitted into cap 16 and has a looped end 17 that engages in a slot in the stem. Before assembly torsion spring 14 and cap 16 extend beyond the bullous head of the handle 6 and assembly consists of simply twisting torsion spring 14 counterclockwise and pushing downward until cap 16 presses into the top of the handle 5. This causes handle 5 to be spring loaded or biased to be rotated in a clockwise direction bringing the stop tap 11 into contact with the left side of the valve body as shown in FIG. 1.

The handle is ideally a molded nylon plastic although it is not limited to this material or method of manufacture. The positioning of the handle skirt over the valve body provides the function of a dust cover over the exposed operating portions of the valve and therefore performs an added function in addition to that already described as a safety limit stop for valve actuation.

Having described my invention in terms of a preferred embodiment, I do not wish to be limited in the scope of the invention except as claimed.

What is claimed is:

1. A locking control valve handle comprising:

a tubular hand grip portion adapted for rotational mounting on a stem of a valve actuator rocking about an axis perpendicular to said stem;

a skirt attached to and extending from said tubular hand grip to encircle said actuator and a portion of a valve body to which said valve actuator is mounted; and said skirt being further provided with a notch which in a first handle rotated operating position about said stem permitting said notch to be aligned along said portion of said valve body to provide a clearance between said skirt and said valve body to permit rocking of said valve actuator to operate said valve, and in a second handle rotated safety position about said stem said notch is rotated out of alignment with said portion of said valve body, thereby allowing said skirt to interfere with said valve body to prevent rocking of said actuator as a valve operation safety device.

2. A locking control valve handle according to claim 1 wherein:

said valve actuator further comprises a rocking cam means mounted for rotation about a pin mounted to said valve body forming said axis for rocking said valve actuator.

3. A locking control valve handle according to claim 2 wherein:

said rocking cam means further operates a spring loaded poppet valve.

4. A locking control valve handle according to claim 1 wherein:

said skirt further comprises a conical portion extending outward and downward from said tubular hand grip and a cylindrical portion attached to said conical portion extending from the outer periphery of said conical portion for a distance sufficient to essentially cover said valve actuator.

5. A locking control valve handle according to claim 4 wherein:

said notch is provided in said cylindrical portion.

6. A locking control valve handle according to claim 1 wherein:

said valve body is mounted to a winch and provides directional control for raising and lowering a winch.

7. A locking control valve handle according to claim 1 wherein:

said tubular hand grip is rotated by hand to said first handle rotated position and is automatically biased in return rotation to towards said second handle rotated position by means of a spring acting between said tubular hand grip and said stem.

8. A locking control valve handle according to claim 7 wherein:

said spring is pressed fit in preloaded contact between said tubular hand grip and said stem to bias said tubular hand grip to rotate about said stem to said second handle rotated position.

9. A tubular locking control valve handle according to claim 7 wherein:

said biased rotation is limited by a stop tab on said skirt which coacts with said valve body as a means of limiting rotation for both said first handle hand rotated position and said second handle rotated position.

* * * * *